(12) United States Patent
Pribble et al.

(10) Patent No.: US 10,747,993 B2
(45) Date of Patent: *Aug. 18, 2020

(54) DETECTING A FRAGMENTED OBJECT IN AN IMAGE

(71) Applicant: Capital One Services, LLC, McLean, VA (US)

(72) Inventors: Jason Pribble, McLean, VA (US); Daniel Alan Jarvis, Alexandria, VA (US); Nicholas Capurso, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,896

(22) Filed: Nov. 7, 2019

(65) Prior Publication Data

US 2020/0074170 A1    Mar. 5, 2020

Related U.S. Application Data

(63) Continuation of application No. 16/458,497, filed on Jul. 1, 2019, now Pat. No. 10,474,888, which is a
(Continued)

(51) Int. Cl.
*G06K 9/34* (2006.01)
*G06K 9/00* (2006.01)
(Continued)

(52) U.S. Cl.
CPC ..... *G06K 9/00449* (2013.01); *G06K 9/00456* (2013.01); *G06K 9/00463* (2013.01);
(Continued)

(58) Field of Classification Search
CPC .. G06K 9/4604; G06K 9/6267; G06K 9/4671; G06K 9/6256; G06T 7/13
(Continued)

(56) References Cited

U.S. PATENT DOCUMENTS 6,360,026 B1    3/2002 Kulkarni et al.
6,430,320 B1    8/2002 Jia et al.
(Continued)

FOREIGN PATENT DOCUMENTS

CN    106228168 A    12/2016

*Primary Examiner* — Charlotte M Baker
(74) *Attorney, Agent, or Firm* — Harrity & Harrity, LLP

(57) ABSTRACT

An example process described herein may involve capturing an image including a document; identifying a first part of the document, wherein the first part of the document is identified based on detecting an outline of the first part of the document; analyzing a first region of the image determined in relation to the first part of the document to detect a second part of the document based on an outline of the second part of the document; identifying the second part of the document based on detecting the first part of the document and analyzing the first region; combining the first part of the document with the second part of the document to generate object data associated with the document, wherein the object data includes data representative of a gap between the first part of the document and the second part of the document; and performing an action related to the object data.

20 Claims, 10 Drawing Sheets

102: A user device captures an image of an object against a dark background

104: Due to dark background and dark parts of the object, the user device cannot detect the object

Related U.S. Application Data continuation of application No. 15/998,999, filed on Aug. 20, 2018, now Pat. No. 10,339,374.

(51) Int. Cl.
  *G06K 9/46* (2006.01)
  *G06K 9/32* (2006.01)
  *G06T 7/13* (2017.01)
  *G06T 7/12* (2017.01)

(52) U.S. Cl.
  CPC ......... *G06K 9/3208* (2013.01); *G06K 9/4604* (2013.01); *G06T 7/12* (2017.01); *G06T 7/13* (2017.01); *G06T 2207/20132* (2013.01)

(58) Field of Classification Search
  USPC ........................................................ 382/175
  See application file for complete search history.

(56) References Cited

U.S. PATENT DOCUMENTS

| | | |
|---|---|---|
| 6,885,478 B1 | 4/2005 | Salgado et al. |
| 6,956,587 B1 | 10/2005 | Anson et al. |
| 8,855,375 B2 | 10/2014 | Macciola et al. |
| 9,672,510 B2 | 6/2017 | Roach et al. |
| 9,779,296 B1 | 10/2017 | Ma et al. |
| 10,339,374 B1 | 7/2019 | Pribble et al. |
| 10,474,888 B1 | 11/2019 | Pribble |
| 2019/0164010 A1* | 5/2019 | Ma .................... G06K 9/4652 |

* cited by examiner

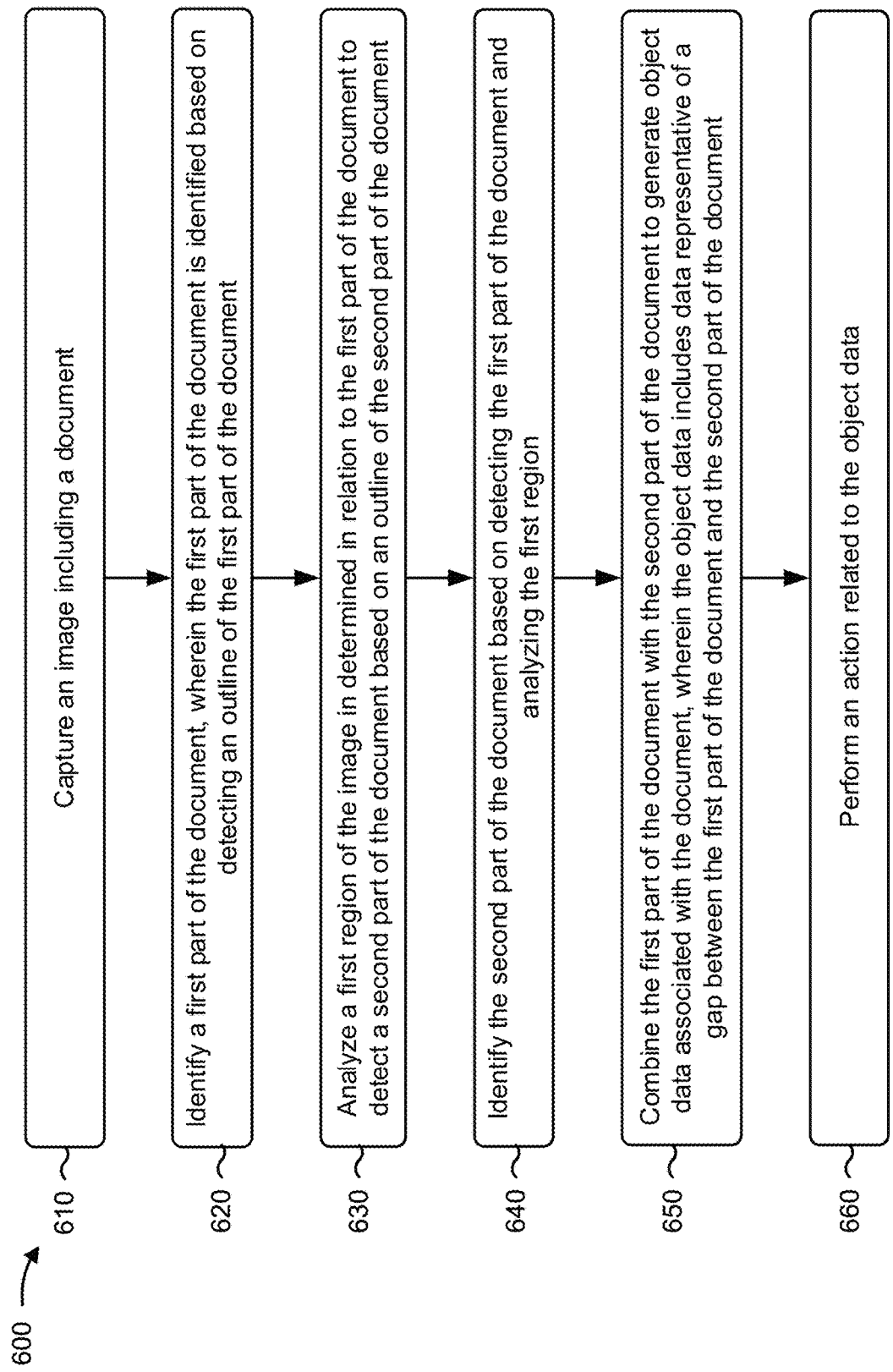

US 10,747,993 B2

DETECTING A FRAGMENTED OBJECT IN AN IMAGE

RELATED APPLICATIONS

This application is a continuation of U.S. patent application Ser. No. 16/458,497, filed Jul. 1, 2019 (now U.S. Pat. No. 10,474,888), which is a continuation of U.S. patent application Ser. No. 15/998,999, filed Aug. 20, 2018 (now U.S. Pat. No. 10,339,374), the contents of which are incorporated herein by reference.

BACKGROUND

A digital image may include an object that can be identified using one or more image processing techniques. The one or more image processing techniques may enable feature extraction, classification, pattern recognition, and/or the like to identify the object. The one or more image processing techniques may be configured to recognize the object by analyzing the digital image to detect particular features or known features of the object.

SUMMARY

According to some implementations, a method may include capturing an image including an object; analyzing the image to identify the object based on a expected aspect ratio of the object; determining that the object cannot be identified in the image based on the expected aspect ratio of the object; analyzing the image to identify a first part of the object based on a expected aspect ratio of the first part of the object; identifying the first part of the object, the first part of the object is identified based on detecting an outline of the first part of the object that corresponds to the expected aspect ratio of the first part of the object; analyzing a first region of the image determined in relation to the first part of the object to detect a second part of the object; identifying the second part of the object based on detecting the first part of the object and based on analyzing the first region; combining first image data associated with the first part of the object and second image data associated with the second part of the object to generate object data associated with the object; and performing an action related to the object data.

According to some implementations, a device may include one or more memories; and one or more processors, communicatively coupled to the one or more memories, to: capture an image including a document, the document including a feature that is located between a first part of the document and a second part of the document, wherein the document has a lighter contrast than a background of the image; identify a first candidate part of the document and a second candidate part of the document, wherein the first candidate part of the document and the second candidate part of the document are identified based on detecting a first outline of the first candidate part of the document and a second outline of the second candidate part of the document; determine that the first candidate part of the document and the second candidate part of the document are associated with the respective first part and second part of the document based on a dimension of the first candidate part of the document corresponding to a dimension of the second candidate part of the document; combine the first candidate part of the document with the second candidate part of the document to generate object data associated with the document, wherein the object data includes data representative of the feature that is located between the first part of the document and the second part of the document; and perform an action related to the object data.

According to some implementations, a non-transitory computer readable medium may include instructions that, when executed by one or more processors of a user device, cause the one or more processors to: capture an image including a document; identify a first part of the document, wherein the first part of the document is identified based on detecting an outline of the first part of the document; analyze a first region of the image determined in relation to the first part of the document to detect a second part of the document based on an outline of the second part of the document; identify the second part of the document based on detecting the first part of the document and analyzing the first region; combine the first part of the document with the second part of the document to generate object data associated with the document, wherein the object data includes data representative of a gap between the first part of the document and the second part of the document; and perform an action related to the object data.

BRIEF DESCRIPTION OF THE DRAWINGS

FIGS. 4-6 are flow charts of example processes for detecting a fragmented object in an image.

DETAILED DESCRIPTION

Figure 1A:
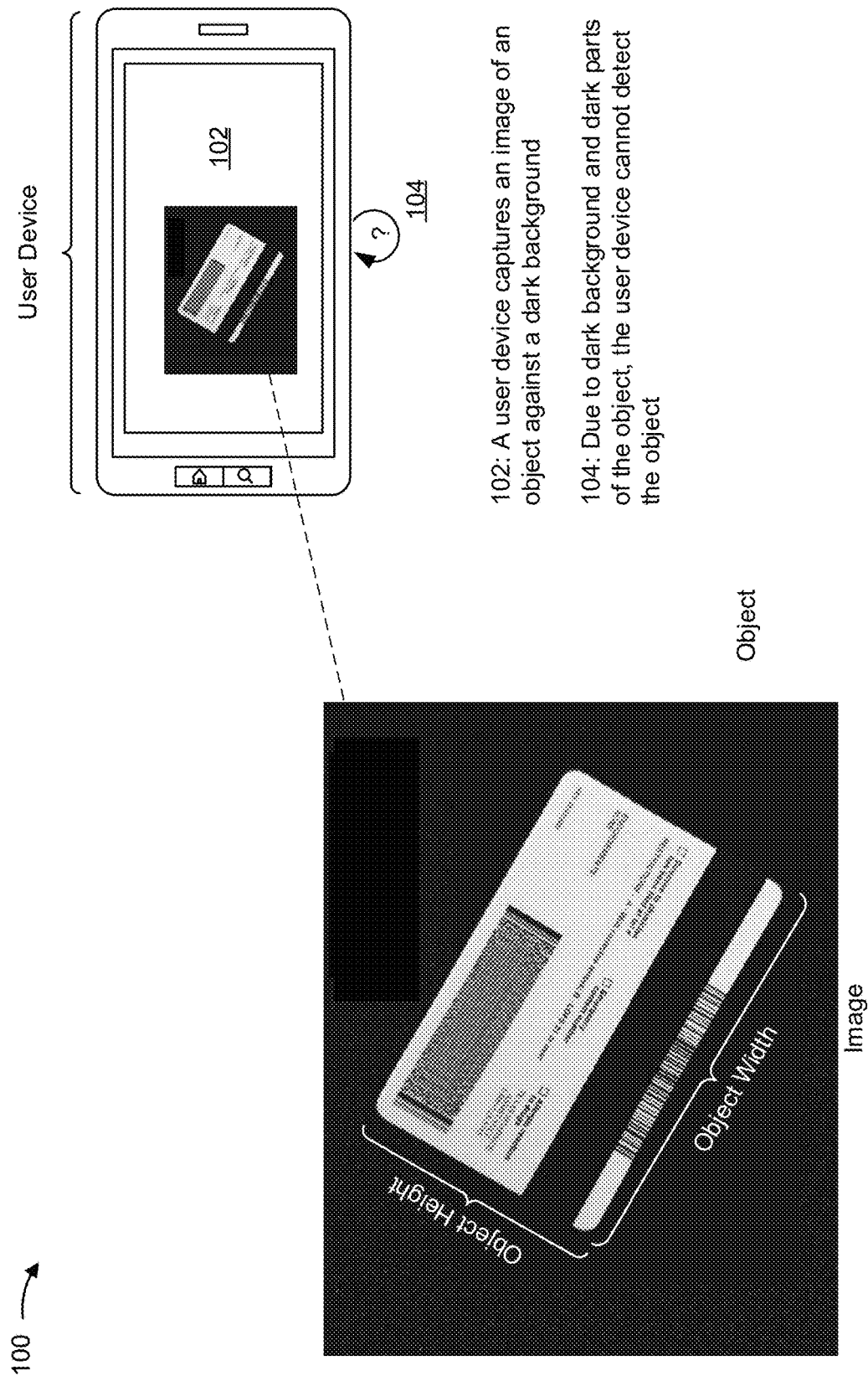
FIGS. 1A-1E are diagrams of an example implementation described herein.

The following detailed description of example implementations refers to the accompanying drawings. The same reference numbers in different drawings may identify the same or similar elements.

Some entities (e.g., financial institutions, such as banks and/or the like) permit account applicants, or customers, to capture images of verification documentation (e.g., government-issued identification (ID) cards and/or the like) and/or financial documentation (e.g., a check, a money order, and/or the like) using a user device (e.g., a smartphone), and submit the images over the Internet for validation. However, this can often be a frustrating process for a user, particularly if an entity's backend platform repeatedly rejects uploaded images for not meeting certain image quality standards. For example, a server of the backend platform may reject the image of a verification documentation if the verification documentation cannot be properly detected. Furthermore, the amount of time required for a user device to capture an image (e.g., in an optimal location or against a desired background), upload the image to the server, and process the image may increase as a size of the image increases and/or a complexity of identifying the image increases. Moreover, as the size of the image increases, more data may be transmitted to the server than may be needed for the server to process the image.

Some implementations, described herein, provide a user device that is able to automatically capture an image including an object, identify parts of the object, determine that the parts of the object, when combined, form an object of interest (e.g., the verification documentation described above), and perform an action associated with the image and/or the object. This is particularly useful when a background of the image is a same or similar color as one or more parts or features (e.g., a magnetic strip, a barcode, and/or the like) of the object such that the one or more parts or features of the object are indistinguishable from the background and thus the object may appear to be fragmented (e.g. the image data appears to include multiple objects).

In some implementations, the user device (e.g., an application executing on the device) may identify a first part of the object and search a region in relation to the first part of the object. In some implementations, the region may include part of an area surrounding or adjacent the first part of the object. In such a case, the user device may search above (e.g., adjacent a first edge of the first part of the object) or below (e.g., adjacent a second edge of the first part) the identified first part of the object for a second part of the object. In such cases, the first part of the object may correspond to a part of the object that is below a magnetic strip (relative to an orientation of the object) and the second part may correspond to a part of the object that is above the magnetic strip (relative to the orientation of the object), or vice versa. In some implementations, the user device may identify one or more sub-parts of a part of the object. For example, if a part of the object includes a barcode, the user device may identify a plurality of sub-parts of that part that correspond to the spaces between lines of the barcode and/or ends of the barcode and edges of the object. In some implementations, the user device may recognize that the parts and/or sub-parts of the object correspond to a same object of interest, and generate object data (e.g., image data of the object) associated with the object and/or an image of the object. In some implementations, the user device may send the object data (e.g., an image of the verification documentation that is cropped from the captured image) to a server device for processing, such as to verify the image or the object within the image, as described above.

In this way, the user device enables identification of an object that appears to have been captured as a fragmented object due to features of the object blending in or matching a background of the image (e.g., due to a shade or hue of the background matching a shade or hue of features of the object). Accordingly, using some implementations described herein, the user device may ensure that an object is identified within an image. Accordingly, some implementations, described herein, may conserve networking and/or processing resources by providing an image of an object that can be verified and/or processed by a device that receives the image over a network. For example, network resources that are wasted in association with receiving an image that cannot be processed (e.g., due to an unidentifiable object in the image) and/or in association with indicating that the image cannot be processed may be conserved. Furthermore, computing resources associated with processing an image that contains an unidentifiable object, generating a response message that the object is not identifiable in the image, and/or the like can be conserved. Moreover, processing of an image that includes a fragmented object, as described herein, may decrease a size of the image, orientation of the image, and/or the like to consume fewer network resources and/or computing resources (e.g., because less data is used to provide an object of interest in the image) than previous techniques of providing the image as captured.

FIGS. 1A-1E are diagrams of an example implementation 100 described herein. Example implementation 100 may include a user device (e.g., a mobile device, such as a smartphone and/or the like) and an object, such as a document (e.g., a document that indicates identification information, a government-issued identification (ID) card, an employee ID card, a health insurance card, a transaction card (e.g., a credit card, a debit card, an automated teller machine (ATM) card, a security key card, and/or the like), a check, a money order, and/or the like). In some implementations, the user device may include a camera (e.g., one or more cameras) configured to capture images, and one or more applications (e.g., provided by, or associated with, an entity, such as a financial institution (e.g., a bank, a credit union, and/or the like)) capable of facilitating image capturing and/or image processing. In some implementations, a user may activate the one or more applications on the user device to capture an image of the object. As described herein, the one or more applications may be configured to analyze the image (e.g., to detect parts of the object), process the image, and/or send the image to another device (e.g., for verification purposes, for further analysis, and/or the like).

As shown in FIG. 1A, and by reference number 102, a user device captures an image including an object. As shown, the object may be a document, such as an ID card, and the image includes a dark background relative to the object, such that portions of the object (e.g., a magnetic strip, lines of a barcode, and/or the like) blend in with the background. For example, the ID card may be placed on a dark surface, such as a dark table, floor, desk, and/or the like. The user may point the camera of the user device toward the object on the dark surface to capture an image including the object. In some implementations, the user device may automatically capture the image (e.g., without receiving a user input) based on detecting a part of the object in a field of view of the camera. In some implementations, the user device may cause a display of the user device to display the image as the user device captures the image (e.g., in real-time (or near real-time).

In some implementations, and as shown in FIG. 1A, the object may have an angle of orientation relative to the image (e.g., the object may be rotated greater than 0 degrees relative to the image). For example, the user and/or user device may capture the image of the object at an angle relative to the field of view of the camera—though this not necessary for the description herein. In some implementations, the user device may process the image to rotate the object (and/or parts of the object) to account for the angle of orientation, as described herein.

As further shown in FIG. 1A, and by reference number 104, due to the dark background and dark parts of the object, the user device may not reliably detect the object (e.g., as a whole). For example, as shown, the ID card includes a magnetic strip and a barcode that, when analyzed within the image against the dark background, may not be detected as part of the ID card or as part of any object (e.g., as if the magnetic strip and/or lines of the barcode are part of the background). In such cases, the user device may not be able to detect the object due to a configuration of image processing. For example, the image processing may be configured to detect a particular type of object (e.g., an identification card, a check, a form (or other document on a sheet of paper), and/or the like) that has a known or expected aspect ratio or dimensions (within thresholds for reliably detecting objects of a type having expected aspect ratios or dimensions). Due to one or more features of the ID card blending into the background, the expected aspect ratio and/or dimensions of the object cannot be used to detect the object. In such cases, the user device may adjust a configuration of the image processing to detect parts of the particular type of object. Accordingly, if an image that includes the object is analyzed, and an object is not detected, the image may be reanalyzed to detect parts of the object using expected aspect ratios and/or expected configurations of parts of the object or expected configurations of features of the object. In this way, an object that is fragmented within an image captured by the user device can be detected, as described herein.

Figure 1B:
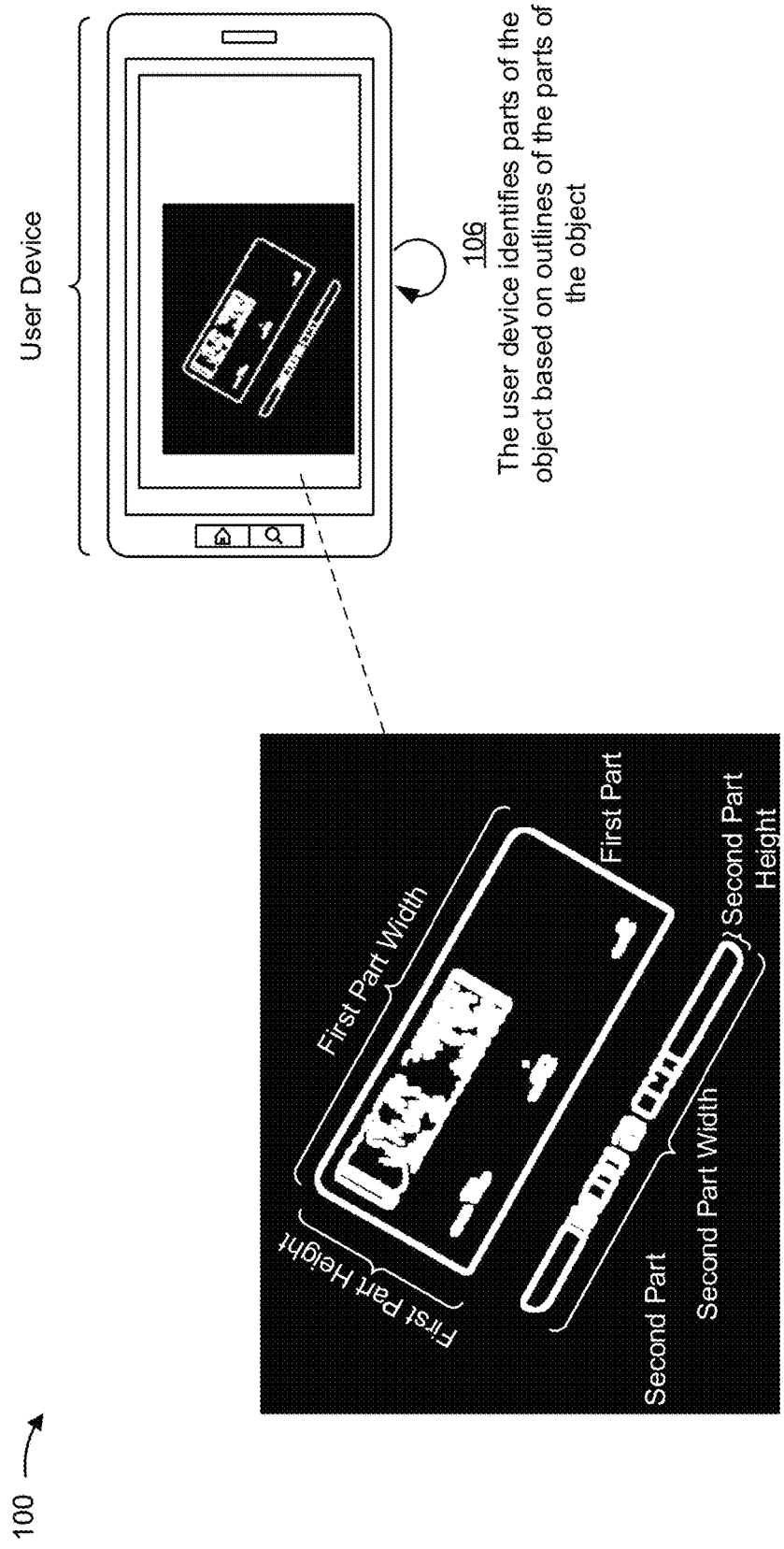

As shown in FIG. 1B, and by reference number 106, the user device identifies parts of the object based on outlines of the parts of the object. In some implementations, the user device may process the image to identify one or more parts of the object in the image. For example, the user device may employ one or more computer vision techniques (e.g., a scale-invariant feature transform (SIFT) technique, a speeded up robust features (SURF) technique, a generalized robust invariant feature (G-RIF) technique, and/or the like) to process the image to detect and identify the one or more parts of the object. In some implementations, processing the image may include determining one or more elements concerning the one or more parts of the object, such as respective outlines of the one or more parts of the object, respective boundary outlines of the one or more parts of the object, respective bounding boxes of the one or more parts of the object, respective bounding rectangles of the one or more parts of the object, respective bounding polygons of the one or more parts of the object, respective shapes around the one or more parts of the object, and/or the like. In some implementations, the user device may cause display of the one or more elements concerning the one or more parts of the object as an overlay (e.g., an augmented reality overlay) on the image. For example, the user device may cause display of a rectangular shape around identified parts of an ID card against the dark background.

In some implementations, the user device may be configured to identify a first part of the object, and, based on identifying the first part of the object, identify a second part of the object. For example, the user device may be configured to identify a bottom part of an ID card (e.g., the part of the ID card that is below a magnetic strip). In such a case, the user device may use an image processing technique configured to identify the bottom part of the ID card based on known or expected aspect ratios and/or dimensions of the bottom part of the ID card. Once the bottom part of the ID card is detected, the user device may analyze one or more regions associated with the bottom part of the ID card to detect a second part of the ID card. For example, using the identified height and width of the first (e.g., bottom) part of the ID card, the user device may analyze a region above the bottom part of the ID card (e.g., a region adjacent an edge along the width of the first part of the ID card) and/or a region below the bottom part of the ID card (e.g., a region adjacent an opposite edge along the width of the first part of the ID card). In such case, the user device may analyze the region above and below the first part of the ID card in case the ID card is inverted relative to the image.

Additionally, or alternatively, the user device may implement one or more image processing techniques configured to identify objects with predetermined characteristics (e.g., an aspect ratio, one or more dimensions, and/or the like) of certain features of the object that may blend in with a background of the image or may otherwise be difficult to reliably detect. For example, the user device may use image processing techniques configured to identify features with a known aspect ratio and/or dimensions indicative of a magnetic strip of the ID card and/or barcode of the ID card. In such cases, the user device may use the known features and/or identified dimensions and/or an identified aspect ratio of the first part of the object to determine an area of a region that is to be analyzed to identify the second part of the object.

In some implementations, the user device may detect a plurality of sub-parts of a part of the object. For example, as shown in FIG. 1B, the second part of the ID card may include a barcode. As such, the user device may identify a plurality of parts corresponding to the spaces between lines of the barcode and the ends of the barcode between the edges along the height of the second object. In some implementations, the user device may use image processing that is configured to analyze a region corresponding to a location of the second part to detect the plurality of sub-parts of the second part. For example, using a known width of the magnetic strip (relative to the aspect ratio of the identified first part of the ID card), the user device may search a portion of the region within which the second part is expected to be located to identify the plurality of sub-parts.

In this way, the user device may detect a plurality of parts of an object that appear fragmented within an image to permit the user device to identify the object and/or generate an image of the object.

Figure 1C:
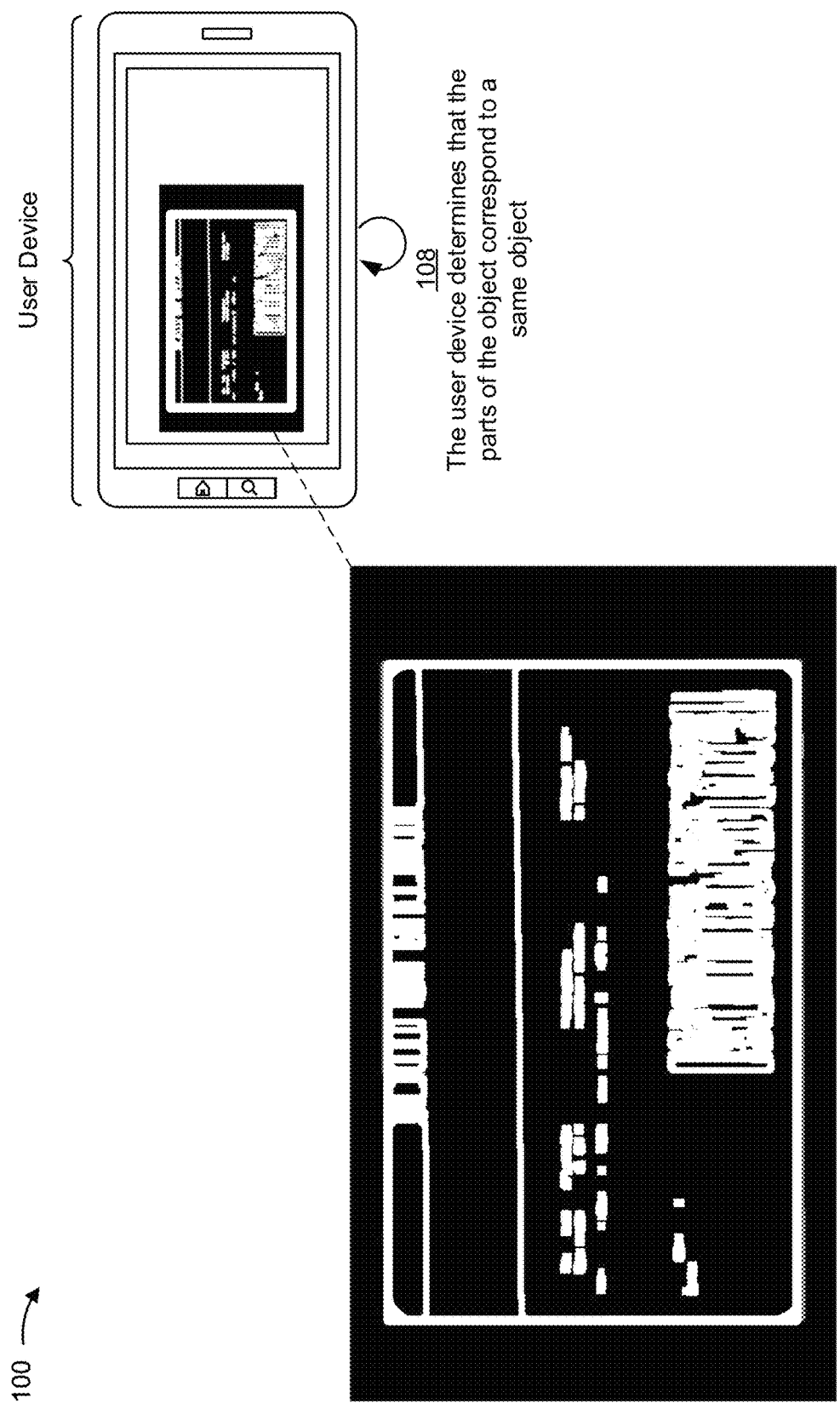

As shown in FIG. 1C, and by reference number 108, the user device determines that the parts of the object correspond to a same object. For example, as shown in FIG. 1C, using one or more dimensions or aspect ratios of the identified first part, second part, or distance between the first part and second part (which may correspond to the magnetic strip of the ID card) the user device may determine that the first part corresponds to a bottom part of the ID card and the second part corresponds to a top part of the ID card. Accordingly, the user device may determine the dimensions and/or location of the ID card within the image based on the dimensions and/or location of the first part of the ID card and the second part of the ID card within the image.

In some implementations, the user device may be configured to identify a feature of the object based on positions of parts of the object within the image. For example, the user device may identify the magnetic strip of the ID card in example implementation 100 based on the first part of the ID card and the second part of the ID card being separated by a distance that corresponds to a width of a magnetic strip (relative to the aspect ratios of the first and second parts of the object). In such cases, the user device may compare dimensions of gaps and/or distances between parts of the ID card to identify the feature of the ID card. Additionally, or alternatively, the user device may identify the barcode within the second part of the object. For example, the user device may determine the plurality of sub-parts being aligned along a same axis within the image and/or that the plurality of sub-parts are separated by distances corresponding to thicknesses of lines of a barcode. Accordingly, when combining the parts of the object to recognize the object, the user device may combine the parts and the identified features to generate an image of the object. As such, image data may be generated and/or used from the image that correspond to the features of the object.

In some implementations, a machine learning model may be used to determine that the plurality of identified parts of the object correspond to an object of interest (e.g., the ID card) based on one or more parameters, such as, one or more known features of the object of interest (e.g., whether the ID card includes a magnetic strip, a barcode, an image (e.g., of a user associated with the ID card), a hologram, identification information (e.g., for an entity, a governmental body, a jurisdiction, and/or the like), one or more dimensions of the object of interest, an aspect ratio of the object of interest, one or more dimensions of an identified feature of the object, an aspect ratio of an identified feature of the object, one or more characteristics of the image (e.g., aspect ratio, one or more dimensions, a resolution of the image, and/or the like), and/or the like. The machine learning model may be trained using historical data associated with identifying and/or combining parts of an object to generate an image of the object and/or object data associated with the object (e.g., using past identifications, combinations of parts, and/or the like). In some implementations, a machine learning model may be trained on the user device. Using the historical data and the one or more parameters to identify and/or combine the parts of the object, the user device may identify and combine the parts to generate an image of the object and/or object data associated with the object.

In some implementations, various machine learning models may be configured for various types of objects (or types of documents). For example, a first machine learning model may be used to identify and/or combine parts of an ID card, a second machine learning model may be used to identify and/or combine parts of a form, a third machine learning model may be used to identify and/or combine parts of a check, and so on. In some implementations, the user device may select a machine learning model, from a plurality of models, to identify and/or combine parts of the object in the image. For example, based on information associated with the user device and/or an application of the user device (e.g., a user input indicating that an image of a particular object is being captured), the user device may select the machine learning model to identify a particular object associated with the machine learning model. In some implementations, the user device may run the plurality of machine learning models simultaneously to detect an image and/or run the machine learning models successively to identify an object in the image. Additionally, or alternatively, the user device may establish a priority associated with running the machine learning models to identify the objects in the image. The example priority may be established based on a history of objects that are detected by the respective learning models, based on a characteristic of the objects that are to be detected by the respective machine learning models (e.g., sizes, dimensions, aspect ratios, and/or the like), and/or the like. Accordingly, the user device may configure an image processing technique to identify various types of objects.

In some implementations, the user device may determine an outline of the object based on one or more characteristics of the identified parts of object. For example, the user device may determine a rectangular outline of the ID card of example implementation 100 based on identified external edges of the ID card from outlines of the parts of the objects. The user device may disregard internal edges of the outlines (e.g., edges that are adjacent gaps between parts of the object) when determining the outline of the ID card based on a known configuration one or more features of the ID card. In some implementations, the user device may display (e.g., in real-time) a rectangular outline (or other shaped outline corresponding to an identified fragmented object) around the ID card to enable the user to detect the ID card within a frame of the camera.

In this way, the user device may determine that the parts of the object are part of an object of interest to permit the user device to process image data associated with the object and/or generate object data associated with the object.

Figure 1D:
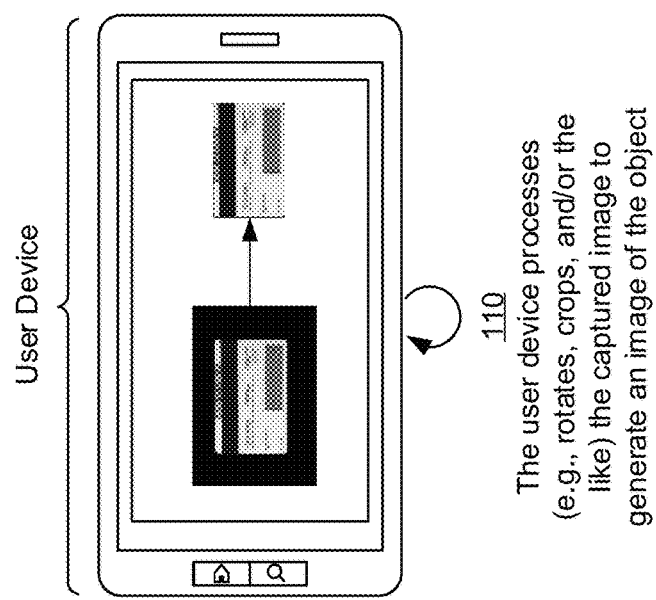

As shown in FIG. 1D, and by reference number 110, the user device processes the captured image to generate an image of the object. For example, the user device may process the image (e.g., by rotating the image or object, resizing the image or object, adjusting an aspect ratio of the image or object, adjusting a resolution of the image or object, and/or the like).

The user device may rotate the object and/or the image using any suitable techniques. In some implementations, the user device may determine that the object within the image is to be rotated based on one or more characteristics of a part of the object. In such cases, the user device may rotate the image, rather than rotate each identified part of the image, before generating object data for the object. For example, the user device may determine an angle of orientation of the identified part of the object (e.g., based on an angle of orientation of one of the identified parts of the object) and a center point of the part of the object (e.g., based on the outline, height, and/or width of the part of the object). The user device may rotate the image based on the angle of orientation, changing dimensions and/or a position of the image. Further, the user device may calculate one or more offset values from the changed dimensions or position of the image and determine a second center point of the part of the object based on the first center point and the offset values (e.g., using a translation of the first center point according to the offset values). As such, the part of the object (and other parts of the object) may be rotated based on the rotation of the image. In such cases, by rotating the image, using a part of the object, the user device may not need to individually calculate a rotation for all identified parts of the object in the image. In this way, processing resources associated with calculating a rotation of the object within the image may be conserved.

In some implementations, the user device may determine the outline of the object based on the identified outlines of the parts of the object, identified features, and/or an outline of the combined parts of the object. In such a case, the user device may use the outline of the object to crop the object from the image. For example, the user device may crop the object from the image based on a center point of the object (e.g., determined after the identified parts of the object are combined) in the image. In some implementations, the object may be cropped from the image after rotation of the image. In some implementations, the user device may crop the image around the object based on the center point of the object in the image after rotation of the image and/or the one or more characteristics of the object. For example, for the ID card of FIG. 1D, the user device can calculate the coordinates of a border of the ID card based on the center point of the ID card, the height of the ID card, and the width of the ID card (e.g., calculate the coordinates of the four corners that comprise the rectangle-shaped government-issued ID card), which enables the user device to crop the ID card from the image, crop the background around the ID card, crop the ID card out of the image, and/or the like.

In this way, the user device may combine parts of the object and process the captured image to provide object data associated with an object within the image.

Figure 1E:
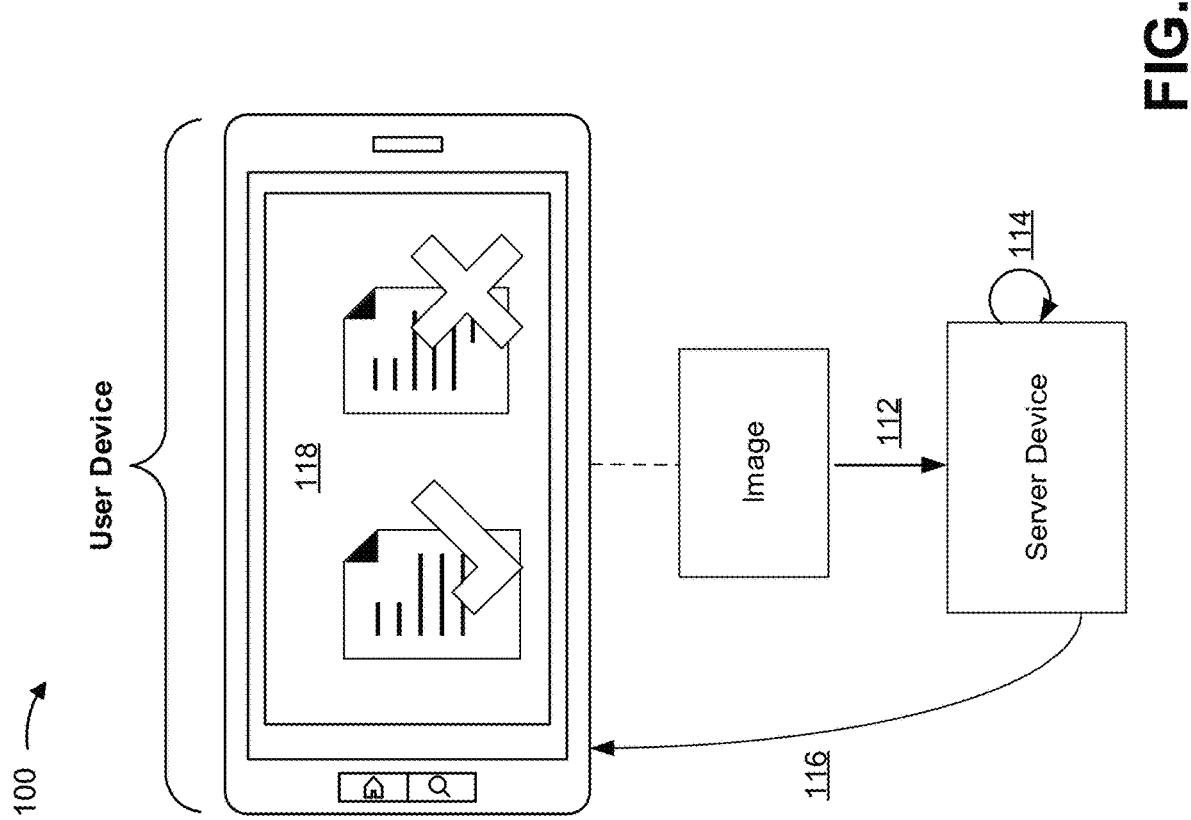

As shown in FIG. 1E, the user device may perform additional and/or alternative actions after rotation of the image. As shown by reference number 112, the user device may send the image to a server device (e.g., the user device may upload the image to an image verification server). For example, the user device may send the image to the server device, after cropping the image around the object, to verify content of the object. As shown by reference number 114, the server device may process the image (e.g., the image verification server may verify the image). For example, the server device may use a computer vision technique to extract data from the image (e.g., extract data concerning the content of the object) and verify that the data is accurate by comparing the data and object-related information from a data structure. As shown by reference number 116, the server device may send a message to the user device regarding the image (e.g., the image verification server may send a message to the user device regarding verification of the image). For example, the server device may send a message to the user device indicating that the data extracted from the image is accurate. As shown by reference number 118, the user device may receive the message and cause display of information regarding the message on the display of the user device (e.g., the user device may present, for display, information indicating whether the image has been verified).

In this way, the user device may identify parts of an object within an image to detect the object, which enables the user device to perform an action related to the object and/or image. In this way, the user device ensures that the object is identified, which can facilitate an image processing application, such as identifying the object as a whole, generating an image of the object as a whole, cropping the object as a whole from the image, and/or the like. In this way, the user device may ensure that an image of the object can be processed and/or verified by another device. Furthermore, the user device may process the image to decrease a size of the image, which shortens the amount of time to upload and/or process the image and conserves network resources. This also conserves computing resources (e.g., processing resources, memory resources, power resources, and/or the like) of the user device that would otherwise need to be expended to provide and/or receive information associated with an image that includes an unidentifiable object or an image that cannot be processed by a receiving device (e.g., for verification). In addition, this conserves computing resources, memory resources, and network resources, associated with the receiving device (e.g., backend platform, such as a server), that would otherwise need to be expended to receive and process images with a fragmented object.

As indicated above, FIGS. 1A-1E are provided merely as examples. Other examples are possible and may differ from what was described with regard to FIGS. 1A-1E.

Figure 2:
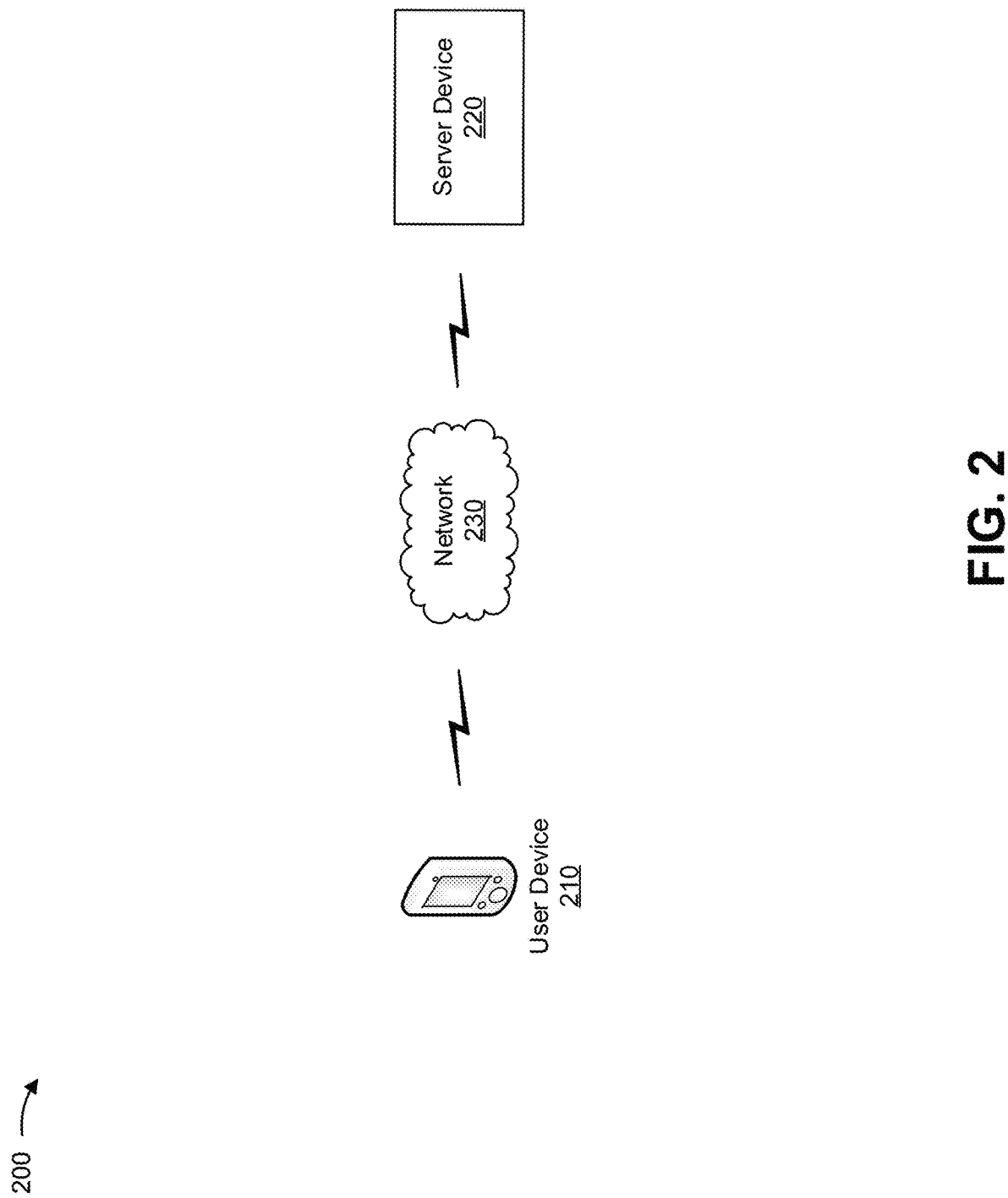
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 includes one or more devices capable of receiving, generating, storing, processing, and/or providing information associated with identifying an object in a captured image. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may send the captured image, via network 230, to server device 220 for processing the captured image. In some implementations, user device 210 may receive a message (e.g., a verification message) from server device 220 and may display the message via a display of user device 210.

In some implementations, as described herein, the user device may identify an image based on identifying a plurality of parts of the object. The user device may determine that the one or more parts correspond to an object of interest, and process the image to provide the object of interest to server device 220.

Server device 220 includes one or more devices capable of storing, processing, and/or routing information associated with processing an image that includes an identified object, as described herein. For example, server device 220 may include a server (e.g., a host server, a web server, an application server, etc.), a data center device, or a similar device, capable of communicating with user device 210 via network 230. Server device 220 may include a communication interface that allows server device 220 to receive information from and/or transmit information to user device 210. In some implementations, server device 220 may receive, from user device 210, an image captured by user device 210, and may process the image. In some implementations, server device 220 may send, to user device 210 via network 230, a message based on processing an image. In some implementations, server device 220 may be an image verification server. In some implementations, server device 220 may receive an image from user device 210 (e.g., user device 210 may upload the image to server device 220). In some implementations, server device 220 may process the image (e.g., the image verification server may verify the image). In some implementations, server device 220 may send a message to user device 210 regarding the image (e.g., the image verification server may send a message to user device 210 regarding verification of the image).

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
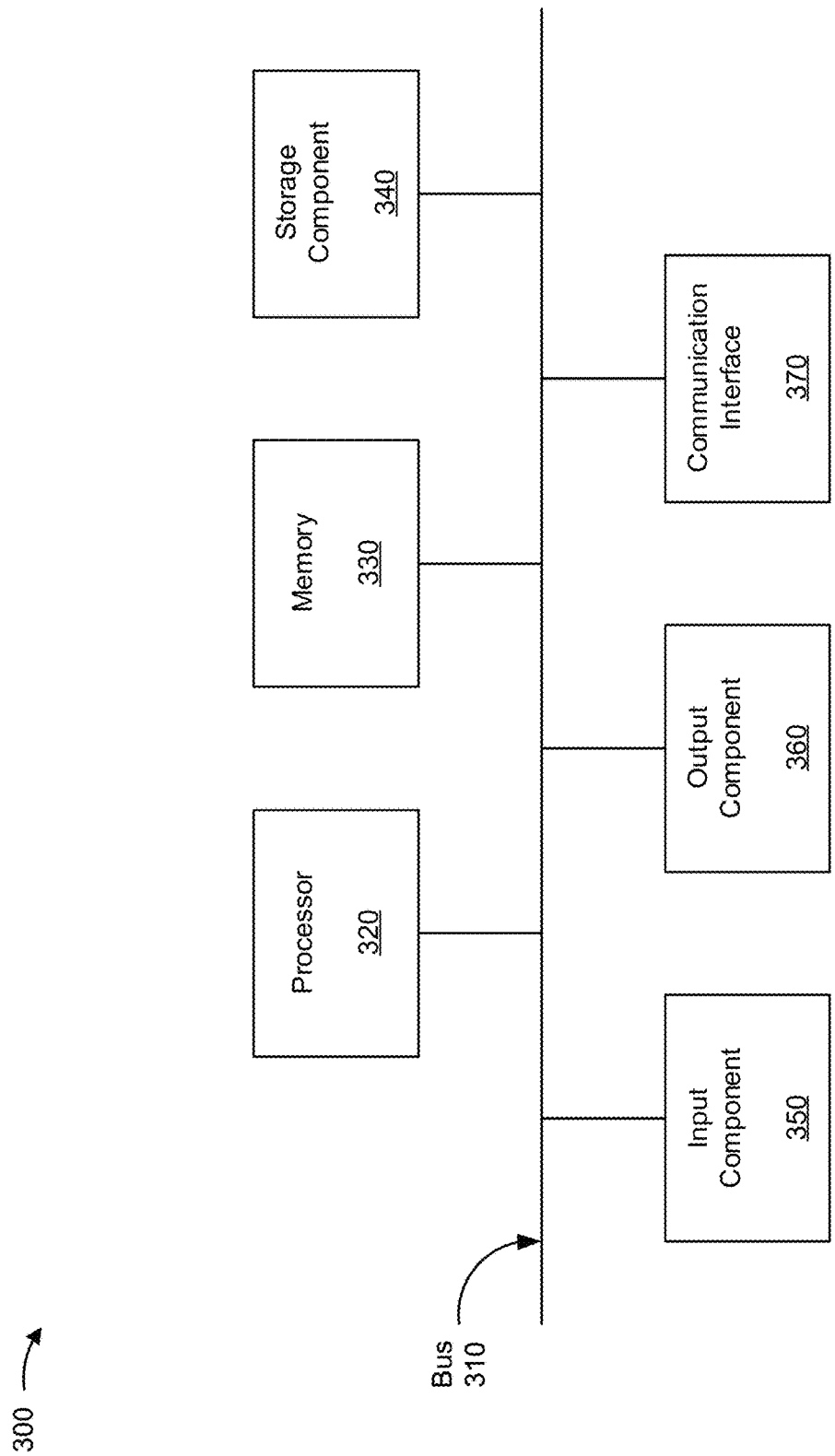
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
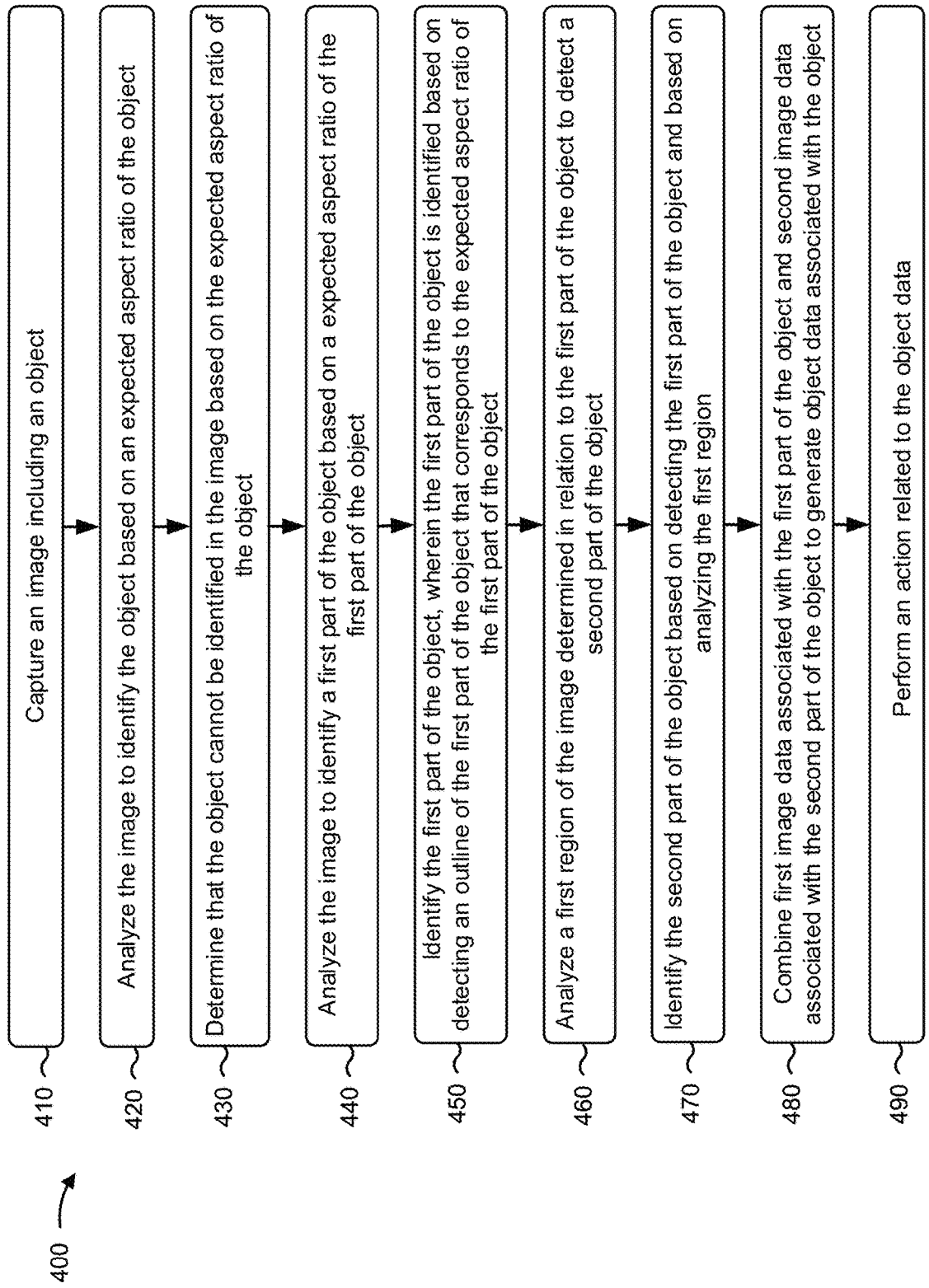

FIG. 4 is a flow chart of an example process 400 for detecting a fragmented object in an image. In some implementations, one or more process blocks of FIG. 4 may be performed by user device 210. In some implementations, one or more process blocks of FIG. 4 may be performed by another device or a group of devices separate from or including user device 210, such as server device 220.

As shown in FIG. 4, process 400 may include capturing an image including an object (block 410). For example, user device, using (e.g., using processor 320, memory 330, input component 350, output component 360, communication interface 370, and/or the like) may capture an image, as described above.

As further shown in FIG. 4, process 400 may include analyzing the image to identify the object based on a expected aspect ratio of the object (block 420). For example, the user device, using (e.g., using processor 320, memory 330, and/or the like) may analyze the image to identify the object based on a expected aspect ratio of the object, as described above.

As further shown in FIG. 4, process 400 may include determining that the object cannot be identified in the image based on the expected aspect ratio of the object (block 430). For example, the user device, using (e.g., using processor 320, memory 330, and/or the like) may determine that the object cannot be identified in the image based on the expected aspect ratio of the object, as described above.

As further shown in FIG. 4, process 400 may include analyzing the image to identify a first part of the object based on a expected aspect ratio of the first part of the object (block 440). For example, the user device, using (e.g., using processor 320, memory 330, and/or the like) may analyze the image to identify a first part of the object based on a expected aspect ratio of the first part of the object, as described above.

As further shown in FIG. 4, process 400 may include identifying the first part of the object, wherein the first part of the object is identified based on detecting an outline of the first part of the object that corresponds to the expected aspect ratio of the first part of the object (block 450). For example, the user device, using (e.g., using processor 320, memory 330, and/or the like) may identify the first part of the object, as described above. In some implementations, the first part of the object is identified based on detecting an outline of the first part of the object that corresponds to the expected aspect ratio of the first part of the object.

As further shown in FIG. 4, process 400 may include analyzing a first region of the image determined in relation to the first part of the object to detect a second part of the object (block 460). For example, the user device, using (e.g., using processor 320, memory 330, and/or the like) may analyze a first region of the image around the first part of the object to detect a second part of the object, as described above.

As further shown in FIG. 4, process 400 may include identifying the second part of the object based on detecting the first part of the object and based on analyzing the first region (block 470). For example, the user device, using (e.g., using processor 320, memory 330, and/or the like) may identify the second part of the object based on detecting the first part of the object and based on analyzing the first region, as described above.

As further shown in FIG. 4, process 400 may include combining first image data associated with the first part of the object and second image data associated with the second part of the object to generate object data associated with the object (block 480). For example, the user device, using (e.g., using processor 320, memory 330, and/or the like) may combine first image data associated with the first part of the object and second image data associated with the second part of the object to generate object data associated with the object, as described above.

As further shown in FIG. 4, process 400 may include performing an action related to the object data (block 490). For example, the user device, using (e.g., using processor 320, memory 330, output component 360, communication interface 370, and/or the like) may perform an action related to the object data, as described above.

Process 400 may include additional implementations, such as any single implementation or any combination of implementations described below and/or in connection with one or more other processes described elsewhere herein.

In some implementations, the user device, when capturing the image including the object, may detect the first part of the object or the second part of the object in a field of view of a camera of the user device; and automatically capture the image based on detecting the first part of the object or the second part of the object in the field of view of the camera.

In some implementations, the user device may generate the object data to include data associated with a gap between the first part of the object and the second part of the object. In some implementations, the object may be a card with a magnetic strip and the data associated with the gap corresponds to image data associated with the magnetic strip.

In some implementations, the user device, when identifying the second part of the card, may identify a plurality of sub-parts of the second part of the object, determine that the plurality of sub-parts of the second part, when combined in a particular manner, are part of the second part of the object, and generate the second image data associated with the second part of the object based on image data associated with the plurality of sub-parts of the second part. In some implementations, the plurality of sub-parts are within a portion of the first region of the image. In some implementations, the user device may search the portion of the first region for the plurality of sub-parts based on an aspect ratio of the second part of the object and one or more dimensions of the first part of the object. According to some implementations, based on identifying the plurality of sub-parts of the second part of the ID card may determine that the plurality of sub-parts, when combined, form the second part of the card. For example, the user device may determine that the plurality of sub-parts are a same height and/or are aligned along a same axis (e.g., have a same edge against the magnetic strip of the ID card or a same external edge of the object).

In some implementations, first region comprises a region of the image that is adjacent a first edge of the first part of the object and one or more dimensions of the first region of the image are based on one or more dimensions of the first part of the object. In some implementations, a first dimension the first region corresponds to a width of the first part of the object, a height of the first part of the object, and the aspect ratio of the object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
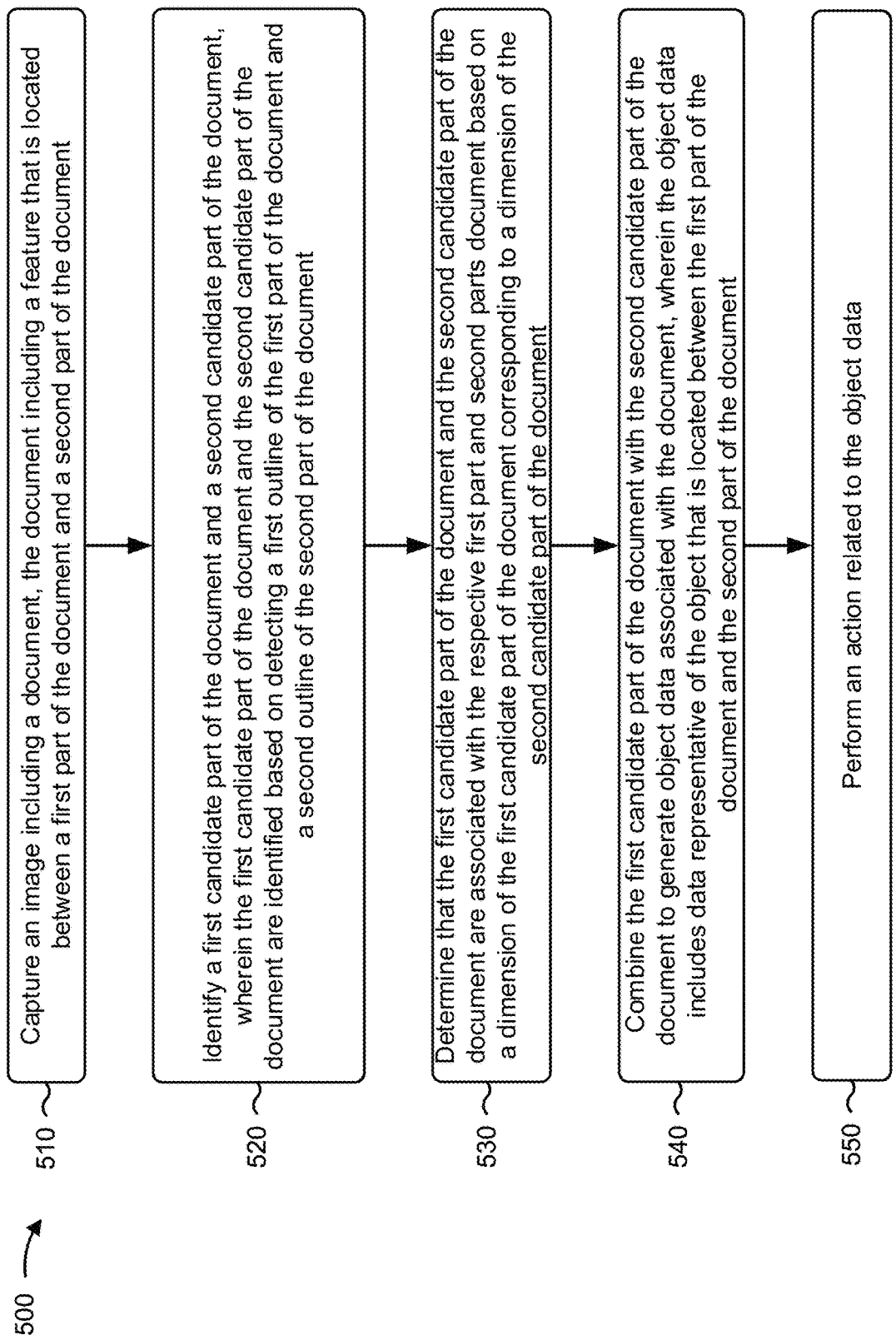

FIG. 5 is a flow chart of an example process 400 for detecting a fragmented object in an image. In some implementations, one or more process blocks of FIG. 5 may be performed by user device 210. In some implementations, one or more process blocks of FIG. 5 may be performed by another device or a group of devices separate from or including user device 210, such as server device 220.

As shown in FIG. 5, process 500 may include capturing an image including a document, the document including a feature that is located between a first part of the document and a second part of the document (block 510). For example, the user device, using (e.g., using processor 320, memory 330, input component 350, and/or the like) may capture an image including a document, as described above. In some implementations, the document includes a feature that is located between a first part of the document and a second part of the document.

As further shown in FIG. 5, process 500 may include identifying a first candidate part of the document and a second candidate part of the document, wherein the first candidate part of the document and the second candidate part of the document are identified based on detecting a first outline of the first candidate part of the document and a second outline of the second candidate part of the document (block 520). For example, the user device, using (e.g., using processor 320, memory 330, and/or the like) may identify a first candidate part of the document and a second candidate part of the document, as described above. In some implementations, the first candidate part of the document and the second candidate part of the document are identified based on detecting a first outline of the first candidate part of the document and a second outline of the second candidate part of the document. In some implementations, the first outline and the second outline are formed from the background of the image and an object that is located between the first candidate part of the document and the second candidate part of the document.

As further shown in FIG. 5, process 500 may include determining that the first candidate part of the document and the second candidate part of the document are associated with the respective first part and second part of the document based on a dimension of the first candidate part of the document corresponding to a dimension of the second candidate part of the document (block 530). For example, the user device, using (e.g., using processor 320, memory 330, and/or the like) may determine that the first candidate part of the document and the second candidate part of the document are associated with the document based on a dimension of the first candidate part of the document corresponding to a dimension of the second candidate part of the document, as described above.

As further shown in FIG. 5, process 500 may include combining the first candidate part of the document with the second candidate part of the document to generate object data associated with the document, wherein the object data includes data representative of the object that is located between the first candidate part of the document and the second candidate part of the document (block 540). For example, the user device, using (e.g., using processor 320, memory 330, and/or the like) may combine the first candidate part of the document with the second candidate part of the document to generate object data associated with the document, as described above. In some implementations, the object data includes data representative of the object that is located between the first candidate part of the document and the second candidate part of the document.

As further shown in FIG. 5, process 500 may include performing an action related to the object data (block 550). For example, the user device, using (e.g., using processor 320, memory 330, output component 360, communication interface 370, and/or the like) may perform an action related to the object data, as described above.

Process 500 may include additional implementations, such as any single implementation or any combination of implementations described below and/or in connection with one or more other processes described elsewhere herein.

In some implementations, the user device may identify the object based on the first outline and the second outline, determine one or more dimensions of the object, and determine that the first candidate part of the document and the second candidate part of the document are associated with the document based on the one or more dimensions of the object. In some implementations, the object corresponds to a magnetic strip of the document.

In some implementations, the user device may generate the object data by combining the data representative of the object, first data representative of the first part of the document, and second data representative of the second part of the document, such that the object data includes an image representative of the document.

In some implementations, the user device may generate the object data by cropping the first part of the document, the second part of the document, and the object from the background of the image and combining first data associated with the first part of the document, second data associated with the second part of the document, and the data representative of the feature.

In some implementations, the user device, when performing the action, are to generate a cropped image of the document based on the object data and send the cropped image to a remote device. In some implementations, the user device may receive a message regarding the cropped image from the remote device and cause display of the message on a display of the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for detecting a fragmented object in an image. In some implementations, one or more process blocks of FIG. 6 may be performed by user device 210. In some implementations, one or more process blocks of FIG. 6 may be performed by another device or a group of devices separate from or including user device 210, such as server device 220.

As shown in FIG. 6, process 600 may include capturing an image of a document (block 610). For example, the user device, using (e.g., using processor 320, memory 330, input component 350, and/or the like) may capture an image of a document, as described above.

As further shown in FIG. 6, process 600 may include identifying a first part of the document, wherein the first part of the document is identified based on detecting an outline of the first part of the document (block 620). For example, the user device, using (e.g., using processor 320, memory 330, and/or the like) may identify a first part of the document, as described above. In some implementations, the first part of the document is identified based on detecting an outline of the first part of the document.

As further shown in FIG. 6, process 600 may include analyzing a first region of the image around the first part of the document to detect a second part of the document based on an outline of the second part of the document (block 630). For example, the user device, using (e.g., using processor 320, memory 330, and/or the like) may analyze a first region of the image around the first part of the document to detect a second part of the document based on an outline of the second part of the document, as described above.

As further shown in FIG. 6, process 600 may include identifying the second part of the document based on detecting the first part of the document and analyzing the first region (block 640). For example, the user device, using (e.g., using processor 320, memory 330, and/or the like) may identify the second part of the document based on detecting the first part of the document and analyzing the first region, as described above.

As further shown in FIG. 6, process 600 may include combining the first part of the document with the second part of the document to generate object data associated with the document, wherein the object data includes data representative of a gap between the first part of the document and the second part of the document (block 650). For example, the user device, using (e.g., using processor 320, memory 330, and/or the like) may combine the first part of the document with the second part of the document to generate object data associated with the document, as described above. In some implementations, the object data includes data representative of a gap between the first part of the document and the second part of the document.

As further shown in FIG. 6, process 600 may include performing an action related to the object data (block 660). For example, the user device, using (e.g., using processor 320, memory 330, output component 360, communication interface 370, and/or the like) may perform an action related to the object data, as described above.

Process 600 may include additional implementations, such as any single implementation or any combination of implementations described below and/or in connection with one or more other processes described elsewhere herein.

In some implementations, the data representative of the gap corresponds to image data for a magnetic strip of the document and the document includes at least one of: a government-issued identification card, an employee identification card, a health insurance card, or a transaction card.

In some implementations, the user device may determine an angle of orientation of the first part of the document in relation to the image. The user device may determine a first center point of the first part of the document; rotate the image based on the angle of orientation. In some implementations, rotating the image based on the angle of orientation changes one or more dimensions of the image. The user device may calculate, after rotating the image, one or more offset values associated with changing the one or more dimensions of the image. The user device may determine, after rotating the image, a second center point of the first part of the document based on the first center point and the one or more offset values. The user device may generate the object data based on the second center point of the first part of the document and the outline of the first part of the document.

In some implementations, the user device, when identifying the second part of the document, may identify a plurality of sub-parts of the second part of the document, determine that the plurality of sub-parts of the second part of the document, when combined, are part of the second part of the document based on the plurality of sub-parts having a same characteristic, and identifying the second part of the document based on the sub-parts of the second part. In some implementations, the plurality of sub-parts are separated by a plurality of gaps within a portion of the first region of the image and the portion of the first region is based on a width of the first part of the document, a height of the first part of the document, and a expected aspect ratio of the document.

In some implementations, the first region is adjacent a first edge of the first part of the document, and the user device may analyze, before analyzing the first region of the image, a second region of the image that is adjacent a second edge of the first part of the document. In some implementations, the second edge is opposite the first edge of the first part of the document. In some implementations, the user device may crop the document from the image based on the outline of the first part of the document and the outline of the second part of the document.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    identifying, by a device, an object type associated with an object associated with an image;
    determining, by the device, that a detected aspect ratio of a first portion of the object, detected in a first region of the image, does not match an expected aspect ratio of the object;
    analyzing, by the device, based on the detected aspect ratio, and based on the first region, a second region of the image to detect a second portion of the object;
    generating, by the device, object data associated with the object,
        the object data identifying the first portion of the object and the second portion of the object; and
    performing, by the device, an action related to the object data.

2. The method of claim 1, wherein determining that the detected aspect ratio of the first portion of the object does not match the expected aspect ratio comprises:
    determining that the detected aspect ratio of the first portion of the object does not satisfy a ratio threshold associated with the object type.

3. The method of claim 1, further comprising:
    identifying, based on the detected aspect ratio, the first portion of the object; and
    determining, based on identifying the first portion of the object, another expected aspect ratio of the second portion of the object; and
    wherein analyzing the second region of the image comprises:
        analyzing the second region of the image based on the other expected aspect ratio.

4. The method of claim 1, further comprising:
    determining, based on a distance between the first portion of the object and the second portion of the object, that the first portion of the object and the second portion of the object correspond to a same object,
        the object data indicating that the first portion of the object and the second portion of the object correspond to the same object.

5. The method of claim 1, wherein performing the action comprises:
    causing the device to display an outline for the object,
        the outline being based on the first portion of the object and the second portion of the object.

6. The method of claim 1, wherein identifying the object type comprises:
    identifying the object type based on one or more features, associated with the object type, being detected in the image.

7. The method of claim 1, wherein identifying the object type comprises:
    identifying the object type based on user input.

8. A device, comprising:
one or more memories; and
one or more processors communicatively coupled to the one or more memories, configured to:
identify an object type associated with an object associated with an image;
determine that a detected aspect ratio of a first portion of the object, detected in a first region of the image, does not match an expected aspect ratio of the object;
analyze, based on the detected aspect ratio and based on the first region, a second region of the image to detect a second portion of the object;
generate object data associated with the object,
the object data identifying the first portion of the object and the second portion of the object; and
perform an action related to the object data.

9. The device of claim 8, wherein the one or more processors, when determining that the detected aspect ratio of the first portion of the object does not match the expected aspect ratio, are configured to:
determine that the detected aspect ratio of the first portion of the object does not satisfy a ratio threshold associated with the object type.

10. The device of claim 8, wherein the one or more processors are further configured to:
identify, based on the detected aspect ratio, the first portion of the object; and
determine, based on identifying the first portion of the object, another expected aspect ratio of the second portion of the object; and
wherein the one or more processors, when analyzing the second region of the image, are configured to:
analyze the second region of the image based on the other expected aspect ratio.

11. The device of claim 8, wherein the one or more processors are further configured to:
determine, based on a distance between the first portion of the object and the second portion of the object, that the first portion of the object and the second portion of the object correspond to a same object,
the object data indicating that the first portion of the object and the second portion of the object correspond to the same object.

12. The device of claim 8, wherein the one or more processors, when performing the action, are configured to:
cause the device to display an outline for the object,
the outline being based on the first portion of the object and the second portion of the object.

13. The device of claim 8, wherein the one or more processors, when identifying the object type, are configured to:
identify the object type based on one or more features, associated with the object type, being detected in the image.

14. The device of claim 8, wherein the one or more processors, when identifying the object type, are configured to:
identify the object type based on user input.

15. A non-transitory computer-readable medium storing instructions, the instructions comprising:
one or more instructions that, when executed by one or more processors of a device, cause the one or more processors to:
identify an object type associated with an object associated with an image;
determine that a detected aspect ratio of a first portion of the object, detected in a first region of the image, does not match an expected aspect ratio of the object;
analyze, based on the detected aspect ratio and based on the first region, a second region of the image to detect a second portion of the object;
generate object data associated with the object,
the object data identifying the first portion of the object and the second portion of the object; and
perform an action related to the object data.

16. The non-transitory computer-readable medium of claim 15, wherein the one or more instructions, that cause the one or more processors to determine that the detected aspect ratio of the first portion of the object does not match the expected aspect ratio, cause the one or more processors to:
determine that the detected aspect ratio of the first portion of the object does not satisfy a ratio threshold associated with the object type.

17. The non-transitory computer-readable medium of claim 15, wherein the one or more instructions, when executed by the one or more processors, further cause the one or more processors to:
identify, based on the detected aspect ratio, the first portion of the object; and
determine, based on identifying the first portion of the object, another expected aspect ratio of the second portion of the object; and
wherein the one or more instructions, that cause the one or more processors to analyze the second region of the image, cause the one or more processors to:
analyze the second region of the image based on the other expected aspect ratio.

18. The non-transitory computer-readable medium of claim 15, wherein the one or more instructions, when executed by the one or more processors, further cause the one or more processors to:
determine, based on a distance between the first portion of the object and the second portion of the object, that the first portion of the object and the second portion of the object correspond to a same object,
the object data indicating that the first portion of the object and the second portion of the object correspond to the same object.

19. The non-transitory computer-readable medium of claim 15, wherein the one or more instructions, that cause the one or more processors to perform the action, cause the one or more processors to:
cause the device to display an outline for the object,
the outline being based on the first portion of the object and the second portion of the object.

20. The non-transitory computer-readable medium of claim 15, wherein the one or more instructions, that cause the one or more processors to identify the object type, cause the one or more processors to:
identify the object type based on one or more features, associated with the object type, being detected in the image.

* * * * *